Aug. 2, 1960
T. C. SMITH
2,947,362
FISHING TOOL
Filed Sept. 6, 1956
4 Sheets-Sheet 1
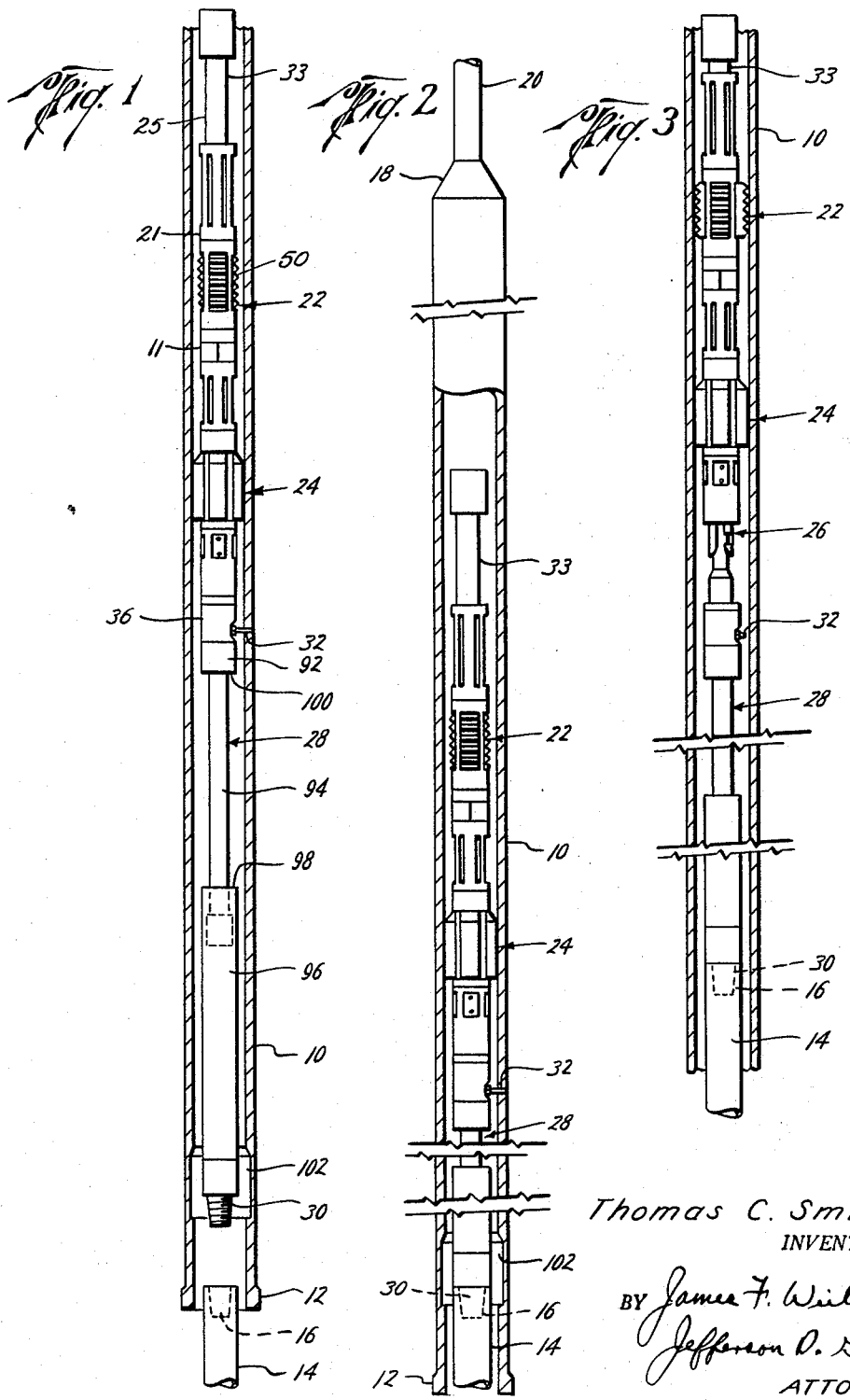
Thomas C. Smith
INVENTOR.
BY James F. Weiler &
Jefferson D. Giller
ATTORNEYS.

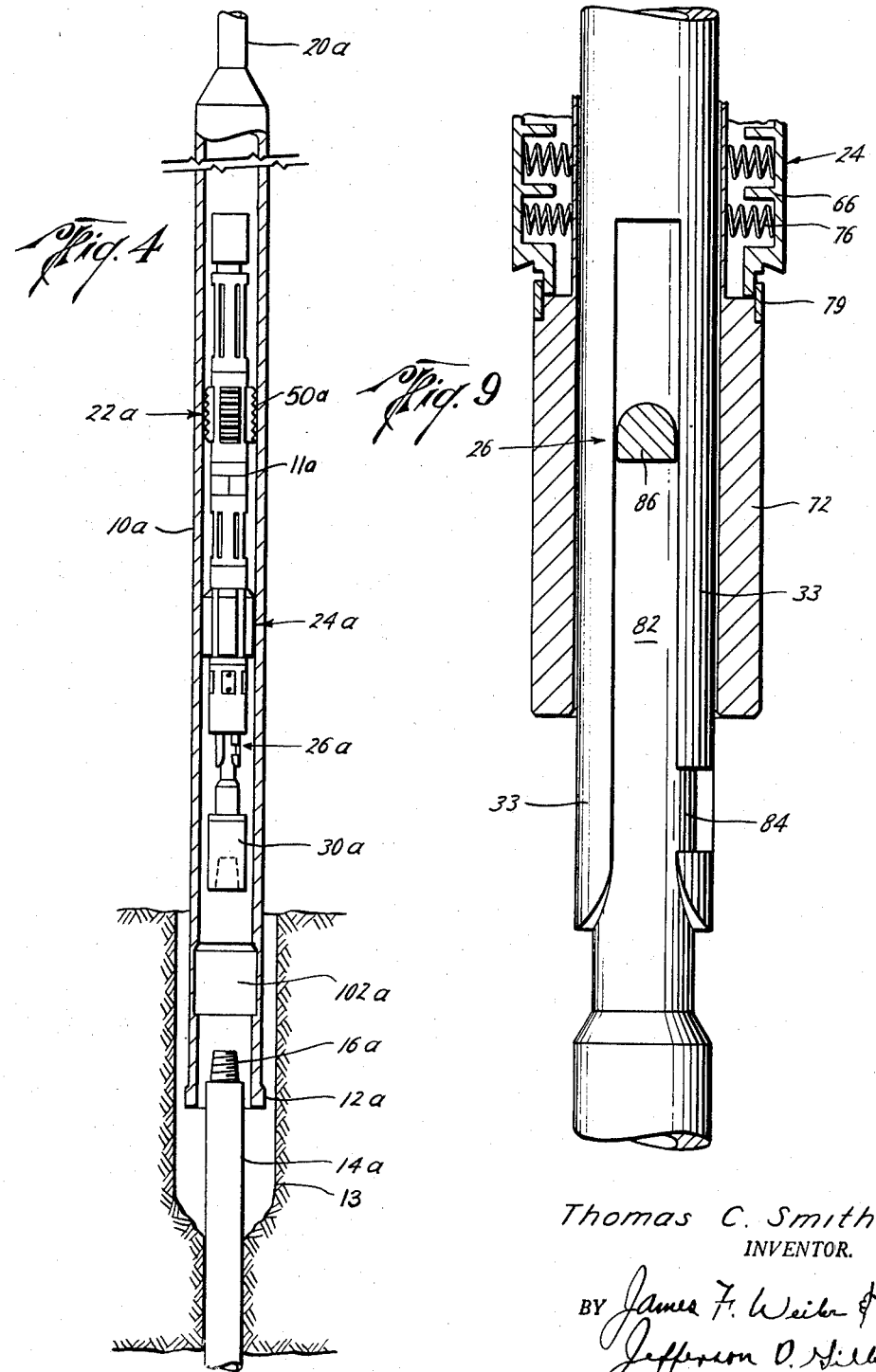

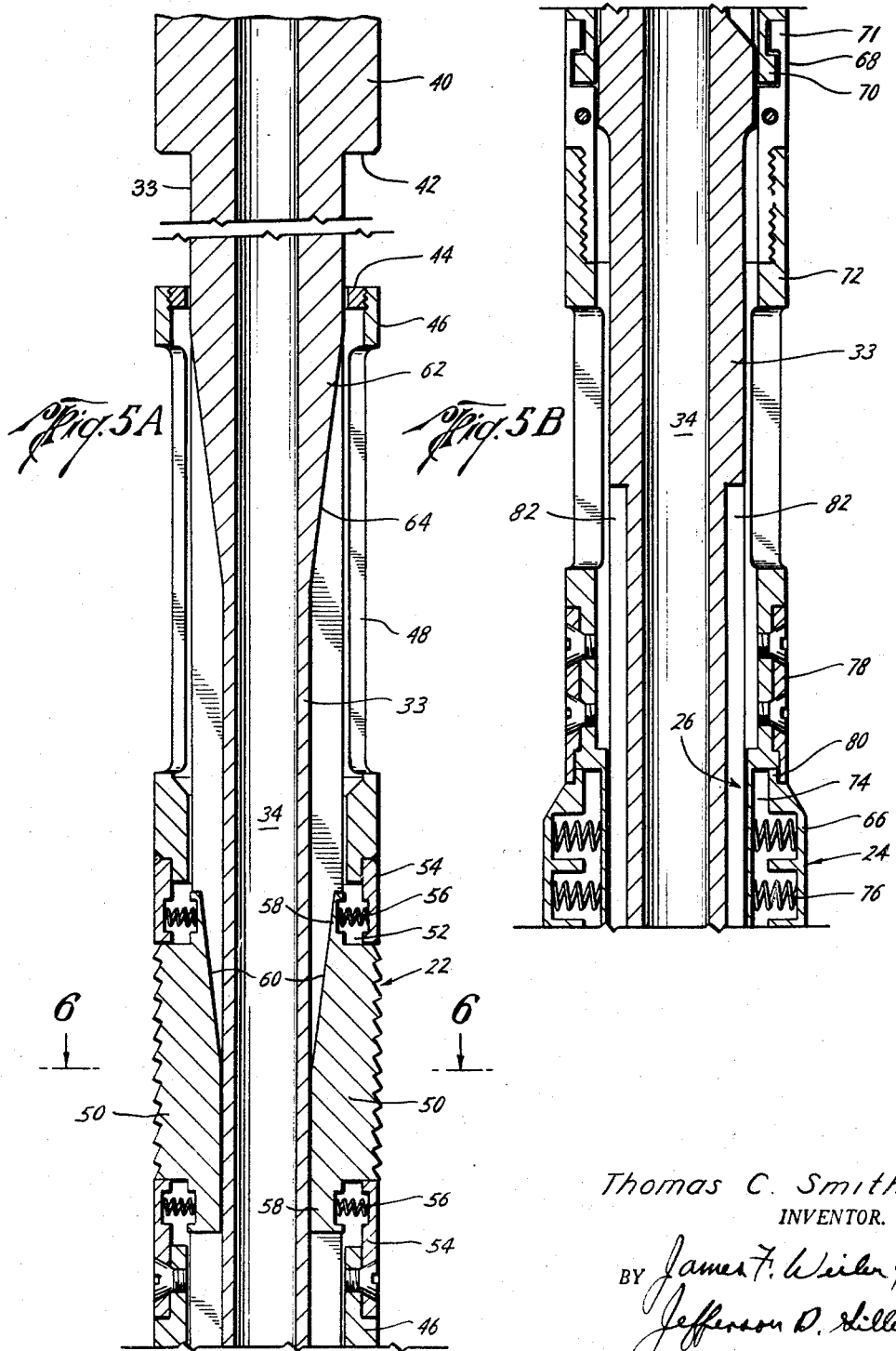

Aug. 2, 1960
T. C. SMITH
2,947,362
FISHING TOOL
Filed Sept. 6, 1956
4 Sheets-Sheet 4
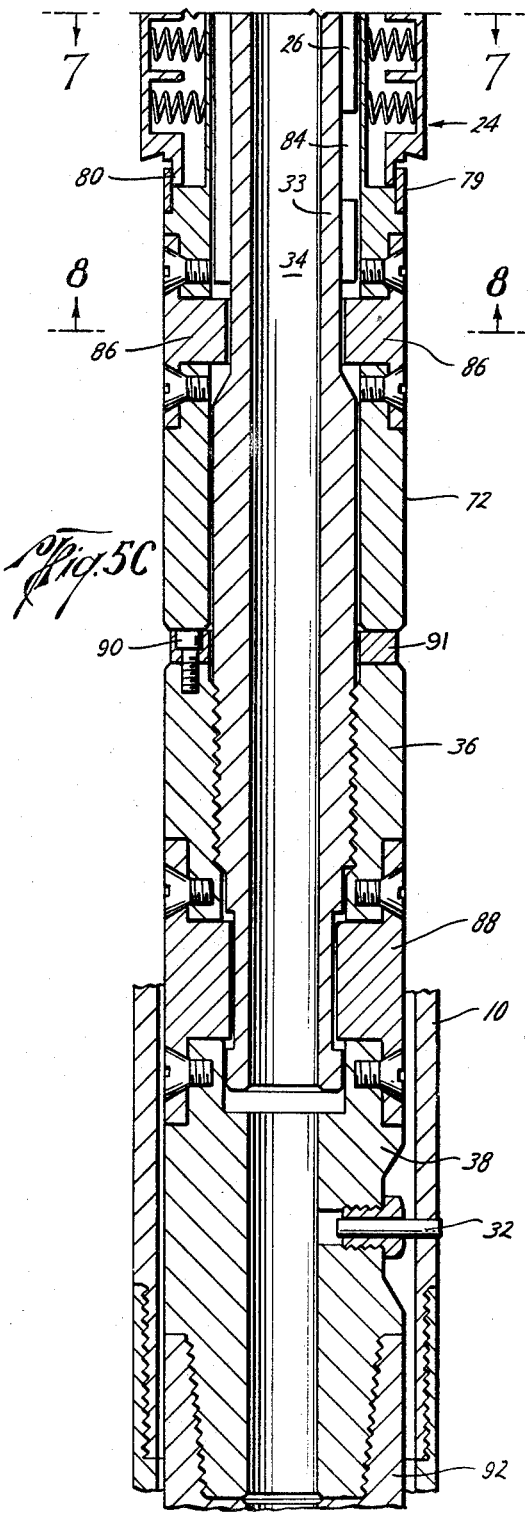
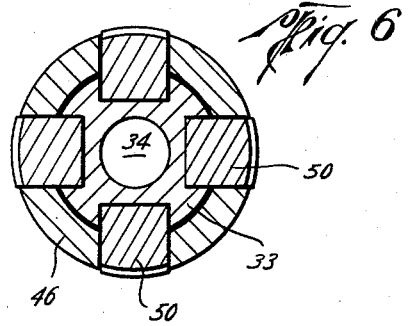
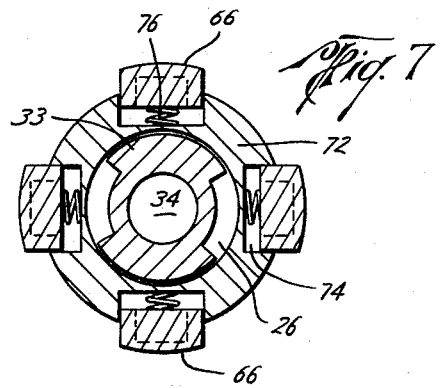
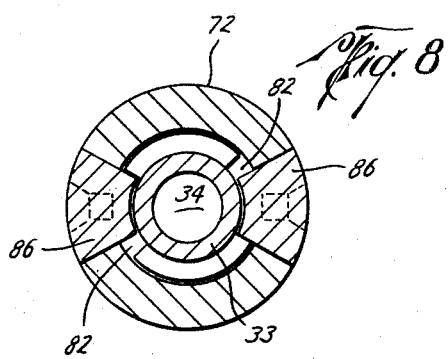
Thomas C. Smith
INVENTOR.
BY James F. Weiler &
Jefferson D. Giller
ATTORNEY

United States Patent Office 2,947,362
Patented Aug. 2, 1960

2,947,362

FISHING TOOL

Thomas C. Smith, Houston, Tex., assignor to Houston Oil Field Material Company, Inc., Houston, Tex., a corporation of Delaware Filed Sept. 6, 1956, Ser. No. 608,387

8 Claims. (Cl. 166—103)

The present invention relates to fishing tools for fishing objects out of well bores and particularly to an improved spear or grappling tool in combination with wash pipe for effectively engaging pipe in a well bore and washing over or reaming around the pipe in order to free it and recover it from the well bore.

The present invention is particularly adapted for recovering from a well bore pipe or drill collars ordinarily having an upstanding box (although it may have an upstanding pin portion), which pipe does not extend to the surface and is stuck in the well bore. This may result from a number of things. The pipe may have become disconnected somewhere along its length either accidentally, such as by the backlash of the bit causing rotation of the drill string in a reverse direction causing unscrewing of a joint of pipe; or intentionally, such as where the drill string is stuck and the free portion thereof has previously been uncoupled and removed and it then becomes desirable to wash over or ream around the stuck pipe to free it and to engage it with a grapple so that it can be removed from the well bore when free.

It would be highly advantageous, and it is an object of this invention, to provide an improved spear or grapple which is securely contained by washover pipe and which may be secured to the fish by manipulation of the washover pipe and then released for washover operations and which includes improved means which prevents the grapple or spear from falling free of the washover pipe on downward movement of the fish relative to the washover pipe.

Yet a further object of the present invention is the provision of an improved combination washover spear or grapple which includes a jar utilized in initially freeing the spear or grapple from the washover pipe and provides sufficient stroke so that the rotary shoe connected to the lower end of the washover pipe may be lifted off bottom at any time without releasing the slips of the spear or the safety joint connecting elements of the spear together. This is particularly advantageous in deep wells where the rotary shoe has a tendency to hang, being rather difficult to free.

A further object of this invention is the provision of a combination washover spear which includes an improved slip arrangement so that the slips may readily be engaged with and disengaged from the washover pipe and which includes improved means that permit the slips to be set without any upstrain so that they will transmit either right-hand or left-hand torque.

Yet a further object of this invention is the provision of a combination washover spear or grapple in which an improved arrangement is utilized in setting the slips to minimize drag and wear on its parts when rotating the washover pipe, such as when washing over the fish after it has been engaged by the spear or grapple.

A further object of this invention is the provision of an improved combination washover spear or grapple which is efficiently reliable and rugged in use and in which a minimum of repairs to the tool are required.

Other and further objects, features and advantages of this invention will appear from the following description of presently-preferred examples of the invention, given for the purpose of disclosure, and taken in conjunction with the accompanying drawings, where like character references designate like parts throughout the several views, and where Figure 1 is a side elevation, partly in section, diagrammatically illustrating a combination washover spear or grapple according to the invention and illustrating its parts in position for going into the well bore, Figure 2 is a view similar to Figure 1 illustrating the tool after it has been connected to the fish and the shear pins releasably connecting the spear to the washover pipe are about to be sheared so that further washover operations may be accomplished, Figure 3 is a view similar to Figures 1 and 2 illustrating the tool and fish being removed from the well bore.

Figure 4 is a view similar to Figure 1 illustrating a modification according to the invention, Figure 5A is an enlarged, fragmentary view, in section, of the upper portion of the tool illustrated in Figure 1, Figure 5B is a continuation of Figure 5A and illustrates the intermediate section of the tool, Figure 5C is a continuation of Figure 5B and illustrates a lower portion of the tool down to the jar and grappling element, Figure 6 is a cross-sectional view taken along the line 6—6 of Figure 5A, Figure 7 is a cross-sectional view taken along the line 7—7 of Figure 5C, Figure 8 is a cross-sectional view taken along the line 8—8 of Figure 5C, and Figure 9 is an enlarged, fragmentary side elevation, partly in section, illustrating a J-slot assembly for actuating the slip assembly.

Turning now to the drawings, and particularly to Figure 1, the tool includes the washover pipe 10 of a diameter sufficient so that the rotary shoe 12 provided at its lower end will fit around the fish 14 and cut away formation as it is rotated and moved downwardly around the fish. The fish 14 ordinarily is a pipe or drill collar having a box 16 facing upwardly and which does not extend to the surface of the well bore, neither the surface nor the well bore being illustrated in Figure 1. As will be apparent later, if a pin extends upwardly, a different type of grapple is provided on the lower end of the spear. As best seen in Figure 2, the upper end of the washover pipe 10 which serves as the outer body of the tool, may be reduced in diameter, as at 18 and connected to an operating string 20 extending to the surface, not shown, by which the tool is manipulated in the well bore 13, as shown in Figure 4.

Turning again to Figure 1, the inner grapple or spear assembly 11 comprises a generally elongate body 21 and a mandrel assembly 25 including a mandrel 33 slidably extending axially through the body 21. The body 21 carries a plurality of slips 50 which are a part of a slip assembly 22 and a wiper or drag blocks 66 which are a part of a drag or wiper assembly 24. The mandrel assembly includes adjacent its lower end a bumper jar 28 and a grapple 30, here illustrated as a tapered tap, at the lower end for engagement with and connection to the upstanding box 16 of the fish 14. The entire inner spear or grapple assembly 11 is connected to the washover pipe 10 by a plurality of shear pins 32, ordinarily four, only one being illustrated to simplify the drawings.

It is noted that but for the shear pins 32, the spear assembly is free to move in the washover pipe 10 except when the slip assembly has been actuated into frictional gripping engagement with the inner wall of the washover pipe 10, as will be described later. This permits the washover pipe 10 to be rotated and moved downwardly relative to the inner spear or grapple assembly in cutting away formations around and sticking the fish 14 in the well bore 13.

Turning now to Figures 5A, 5B and 5C the mandrel 33 provided with an internal passage 34 extends downwardly through the body 21 and is connected at its lower end by the shear pin coupling 36 (Figure 5C) to the shear pin connector 38 which is connected to the upper end of the bumper jar 28 illustrated in Figure 1, the internal passage 34 continuing throughout these parts and through the grapple 30. Thus, the mandrel 33 slidably extends through the body 21 and is connected through the bumper jar 28 to the grapple 30 and a passage is provided throughout. As will be described later in detail, a J-slot arrangement prevents and permits this sliding movement of the mandrel 33 in manipulating the tool.

Turning again to Figure 5A, the upper end of the mandrel 33 is provided with the enlarged head 40 having the downwardly facing annular shoulder 42 which engages the annular stop shoulder 44 at the upper end of the slip cage 46 to limit downward movement of the mandrel 33 if such becomes necessary. This is a safety measure and ordinarily the shoulders 42 and 44 do not engage one another.

Since the well bore is ordinarily filled with drilling fluid, the upper portion of the generally tubular slip cage 46 is slotted, as at 48, to prevent drill fluid from interfering with the movement of the mandrel 33 relative to the slip cage 46.

A plurality of slips 50, here illustrated as four in number although any desired number may be used, are slidably held in the windows 52 in the slip cage 46 and are adapted to move radially outwardly into frictional engagement with the inner wall of the washover pipe 10 (not shown in this view) and to be retracted radially inwardly from such engagement. The retainer rings 54 are provided at the upper and lower ends of the slips 50 and the compression springs 56 are similarly provided and engage the rings 54 and the ears 58 at each end of each slip 50 for resiliently maintaining the slips 50 in retracted position.

The inner surfaces of the slips 50 have upwardly diverging guide surfaces 60 which engage the slip setting core or expander 62 having the coacting slide surfaces 64. Thus, upon downward movement of the mandrel 33 relative to the slip cage 46, the slip expander expands the slips 50, and upon upward relative movement thereof, the springs 56 urge the slips 50 into retracted position. The construction of this slip assembly 22 is conventional practice and no more discussion thereof is deemed necessary.

In order to provide this relative movement it is necessary to maintain the slip cage 46 stationary relative to the mandrel 33, and to this end the wiper or drag assembly 24 is connected to the slip cage 46. The wiper or drag assembly 24 engages the inner wall of the washover pipe 10, as previously described, so that it drags on the washover pipe 10 so that it in turn holds the slip cage 46 so that the mandrel 33 moves relative to the slips. In order to prevent wear on the wiper elements or drag blocks 66 of the drag block assembly 24 after the fish has been engaged by the grapple 30 and the washover pipe 10 is rotated to cut away formation around the fish 14, and as best seen in Figure 5B, a rotary connection 68 is provided which include the interengaging bushing elements 70 and 71 connected to the lower end of the slip cage 46 and the upper end of the wiper cage 72.

The wiper cage 72 slidably surrounds the mandrel 33 and includes the windows 74 into which the wiper or drag blocks 66 slidably fit. A plurality of springs 76 yieldingly urge the wiper or drag blocks 66 radially outwardly so that they engage and drag against the inner wall of the washover pipe 10 (not shown in this view) as previously described. A pair of retainer rings 78 and 79 are disposed above and below the wiper or drag blocks 66, respectively, and engage the ears 80 thereon to prevent them from falling out of the tool. Any conventional wiper or drag assembly may be used.

As best seen in Figure 9, and also shown in Figures 5B and 5C, a J-slot assembly 26 is provided which includes a J-slot having a longitudinal leg or groove 82 and a communicating lateral leg 84, both formed in the mandrel 33, in which, as a part of the J-slot assembly 26, the pin 86 secured to the wiper cage 72 (Figure 5C) moves. Only one J-slot assembly is illustrated in Figure 9 in order to better illustrate this assembly, but as seen in Figures 5B and 5C two such assemblies are provided in the tool disclosed. The J-slot assembly 26 is conventional and any desired J-slot assembly or assemblies may be used to permit sliding movement of the mandrel 33 with respect to the slips 50 and the wiper or drag assembly 26 in order to expand the slips 50 (Figure 5A) and to lock the mandrel 33 relative to the slips 50 and the wiper or drag assembly 26 so that the slips 50 can be held in retracted position.

As mentioned previously, the slip assembly, wiper or drag assembly, and J-slot assembly are all conventional and any satisfactory means may be employed to expand and retract the slips 50.

Turning again to Figure 5C, the shear pin coupling 36 is threaded to the lower end of the mandrel 33 and constitutes an extension thereof. The keys 88 are provided to prevent the mandrel from inadvertently backing out of the shear pin coupling 36 and connect it to the shear pin connector 38. An annular bearing sleeve or bushing 91 is secured by pins 90 (one only being here shown) on the top of the shear pin coupling 36 and provides a bearing surface between it and the lower end of the wiper cage 72 during relative movement between the two as will be explained later.

As mentioned previously, the shear pin sub 36 also includes a plurality of shear pins 32 extending radially therefrom by which the spear is releasably connected to the body or washover pipe 10. For ease of assembly, the shear pins 32 may be threaded bolts although any preferred form of shear pins may be used.

The lower end of the shear pin connector 38 is threaded to the bumper jar 28 and turning to Figure 1, this includes the upper joint 92, the mandrel 94 slidably received in the generally tubular bumper jar body 96 which has the threaded pin or tapered tap 30 provided at its lower end to grapple the fish 14. The jar 28 may be any preferred jar and should include relatively movable parts in interengaging relationship and be provided with engageable anvil and hammer surfaces, such as illustrated at 98 and 100, respectively, so that a sharp blow may be struck. In order to transmit rotation through the bumper jar 28 from the washover pipe 10 and to the grapple 30 the bumper jar elements 94 and 96 are nonrotatably connected together.

In use, the tool is lowered into the well bore with the parts in position as illustrated in Figure 1. In this position, the slips 50 are retracted and the shear pins 32 hold the inner spear or grapple assembly 11 stationary relative to the washover pipe 10 and the mandrel 33 stationary relative to the other parts of the inner spear or grapple assembly so that the slips 50 remain in retracted position.

After the rotary shoe 12 contacts and passes over the upper end of the fish 14, the lower pin connection or grapple 30 approaches and is screwed into the upstanding box 16 thereof, the necessary torque being transmitted from the outer body or washover pipe 10 through the shear pins 32 to the inner spear or grapple assembly, as best seen in Figure 2.

After the inner spear or grapple assembly is secured to the fish 14, here shown a drill collar, a downstroke of the body or washover pipe 10 shears the shear pins 32 and releases the washover pipe 10 from the inner spear or grapple assembly. Washover operations are then begun, the washover pipe being rotated and lowered and the rotary shoe cutting away formations from around the drill collars 14.

After a sufficient depth has been attained, the washover pipe 10 is picked up and the drag assembly 24 acting against the washover pipe 10 causes a relative movement between the slips 50 and the mandrel 33 thereby actuating the slips 50 into frictional engagement with the outer body or washover pipe 10. The entire tool and freed drill collars are then pulled from the well bore.

In the event the drill collars 14 become free during the washover operations and fall, the slips 50 will be set in the manner just described thus holding the drill collars 14 securely within the washover pipe or outer body 10. The entire tool and freed drill collars are then pulled from the well bore.

If the slips 50 should be set by means of the J-slot arrangement 26, the inner spear assembly can be placed in a released position, that is the pin 86 in the lateral leg 84 so that the washover pipe may be raised in making connections to the operating string 20 extending to the surface.

As seen in Figures 1 and 2, an undercut portion 102 is provided at the lower end of the body or washover pipe 10 into which the wiper blocks 66 extend and are held which causes the slips 50 to set. This is a safety feature so that although the slips 50 are stubborn in setting, the inner spear or grapple assembly cannot be pulled entirely free of the outer body or washover pipe 10. This is particularly advantageous if the drill collars 14 start to fall during washover operations.

In practice, a safety joint is provided between the grapple 30 and the bumper jar 28 for the purpose of releasing the inner spear assembly from the fish 14. Preferably, this is a J-slot type safety joint similar to the J-slot assembly 26 previously described and includes a shear pin for releasably holding the members together. In such a safety joint either in collapsed or extended position torque can be transmitted in either direction, but in the intermediate position preferably the safety joint releases to the left and hooks up to the right for most oil field operations.

It is noted that the bumper jar 28 advantageously provides a means of shearing the pins 32 by means of downstroke jarring rather than tension thus permitting upstroke shearing of the pins in the safety joint, not shown. Also, a sufficient stroke is provided so that the rotary shoe 12 may be picked off bottom without the necessity of releasing the slips or the safety joint. This is particularly advantageous in deep holes where the rotary shoe has a tendency to hang up, being rather difficult to free, thereby facilitating removal of the tool and drill collars 14 from the well bore.

A modification is illustrated in Figure 4, where the letter "a" has been added to parts corresponding to those in the other figures. In this embodiment of the invention, the shear pins 32 have been omitted and the inner spear assembly 11a is releasably supported in the outer body or washover pipe 10a by the slips 50a. Also, a different type grapple 30a is provided to engage the upstanding pin 16a of the fish 14a, the grapple being generally of the box or overshot type to fit over and grip the fish. Also, the bumper jar 28 has been omitted. All other parts are the same as in the first-described embodiment except that the slips 50a are set when going into the hole, torque is transmitted through the slips 50a in securing the grapple 30a to the fish 14a and then the slips 50a are released by manipulating the operating string 20a and the J-slot arrangement 26a placed in released locked position. Washover and subsequent operations as previously described may then be commenced.

Obviously, any suitable type grapple may be used with either of these embodiments and in both the bumper jar may either be omitted or employed. Other changes and rearrangement of parts may be made which are within the spirit of the invention and the scope of the appended claims.

The present invention is well suited to carry out the objects and attain the ends and advantages mentioned as well as others inherent therein.

What is claimed is:

1. A combination washover and grappling tool comprising, a washover pipe adapted to be lowered into a well bore and having an internal diameter sufficient to fit about a fish in the well bore, a grappling assembly in the washover pipe including a generally elongate body, slips carried by the body arranged to grip an inner wall of the washover pipe, a mandrel slidably extending through the body, a slip expander on the mandrel engaging and expanding the slips on downward movement of the mandrel relative to the body, drag members carried by the body yieldingly engaging the inner wall of the washover pipe, shear pins initially securing the grappling assembly to the washover pipe, a grapple carried by the mandrel for engaging and grappling the fish, said washover pipe having an annular undercut portion adjacent its lower end adapted to receive said drag elements on downward movement of the body relative to the washover pipe thereby preventing such continued downward movement, said body and mandrel one of which is provided with a J-slot and the other with a pin movable in the J-slot for releasably locking the mandrel and body relative to on another.

2. The combination of claim 1 including rotary connecting means connected between the body and drag members adapted to permit the drag members to rotate with the washover pipe.

3. A combination washover and grappling tool comprising, a washover pipe adapted to be lowered into a well bore and having an internal diameter sufficient to fit about a fish in the well bore, a grappling assembly in the washover pipe including a generally elongate body, slips carried by the body arranged to grip an inner wall of the washover pipe, a mandrel slidably extending through the body, a slip expander on the mandrel engaging and expanding the slips on downward movement of the mandrel relative to the body, drag members carried by the body yieldingly engaging the inner wall of the washover pipe, one of said body and mandrel provided with a J-slot and the other with a pin movable in the J-slot releasably locking the mandrel and body relative to one another thereby releasably locking the slip expander relative to the slips, a grapple carried by the mandrel for engaging and grappling the fish, rotary connector means between the slips and drag member arranged to permit rotation of the drag members with the washover pipe when the slips are set, said washover pipe having an annular undercut portion adjacent its lower end adapted to receive said drag elements and thereby prevent continued downward movement of the body relative to the washover pipe.

4. A combination washover and grappling tool comprising, a washover pipe adapted to be lowered into a well bore and having an internal diameter sufficient to fit about a fish in the well bore, a grappling assembly in the washover pipe including a generally elongate body, slips carried by the body arranged to grip an inner wall of the washover pipe, a mandrel slidably extending through the body, a slip expander on the mandrel engaging and expanding the slips on downward movement of the mandrel relative to the body, drag members carried by the body yieldingly engaging the inner wall of the washover pipe, releasable locking means on the body and the mandrel adapted to be actuated to hold the mandrel stationary relative to the body thereby releasably locking the slip expander relative to the slips, a grapple carried by the mandrel for engaging and grappling the fish, said washover pipe having an annular undercut portion adjacent its lower end adapted to receive said drag elements and thereby prevent continued downward movement of the body relative to the washover pipe, and shear pins initially securing the mandrel to the washover pipe.

5. The combination of claim 4 including rotary connecting means connected between the body and drag members adapted to permit the drag members to rotate with the washover pipe.

6. A combination washover and grappling tool comprising a washover pipe adapted to be lowered into a well bore and having an internal diameter sufficient to fit around a fish in the well bore, a grappling assembly in the washover pipe including a generally elongate body, slips carried by the body arranged to grip an inner wall of the washover pipe, a mandrel slidably extending through the body, a slip expander on the mandrel engaging and expanding the slips on downward movement of the mandrel relative to the body, drag members carried by the body yieldingly engaging the inner wall of the washover pipe, a bumper jar rigidly connected to the lower end of the mandrel, a grapple nonrotatably secured to and carried by the bumper jar for engaging and grappling the fish, rotary connector means between the slips and drag members arranged to permit rotation of the drag members about the mandrel, said washover pipe having an annular undercut portion adjacent its lower end adapted to receive said drag elements on downward movement of the body relative to the washover pipe thereby preventing such continued downward movement, one of said body and mandrel provided with a J-slot and the other with a pin movable in the J-slot releasably locking the mandrel and body relative to one another thereby releasably locking the slip expander relative to the slips, and shear pins initially connecting the mandrel to the washover pipe.

7. A combination washover and grappling tool comprising, a washover pipe adapted to be lowered into a well bore and having an internal diameter sufficient to fit about a fish in the well bore, a grappling assembly in the washover pipe including a generally elongate body, slips carried by the body arranged to grip an inner wall of the washover pipe, a mandrel slidably extending through the body, a slip expander on the mandrel engaging and expanding the slips on downward movement of the mandrel relative to the body, drag members carried by the body yieldably engaging the inner wall of the washover pipe, releasable locking means on the body and the mandrel adapted to be actuated to hold the mandrel stationary relative to the body thereby releasably locking the slip expander relative to the slips, said washover pipe having an annular undercut portion adjacent its lower end adapted to receive said drag elements on downward movement of the body relative to the washover pipe thereby preventing such continued downward movement, a bumper jar comprising two telescopically connected elements, said bumper jar elements being nonrotatably connected together, one of said bumper jar elements being secured to the lower end of said mandrel, and a grapple secured to the other bumper jar element.

8. The combination of claim 7 including rotary connecting means connected between the body and drag members adapted to permit the drag members to rotate with the washover pipe.

References Cited in the file of this patent
UNITED STATES PATENTS

| | | |
|---|---|---|
| 2,762,438 | Naylor | Sept. 11, 1956 |
| 2,771,957 | Weber | Nov. 27, 1956 |
| 2,804,151 | LeBus | Aug. 27, 1957 |
| 2,818,232 | Osmun | Dec. 31, 1957 |